Feb. 5, 1946.  D. W. SCHAEFFER  2,394,490
TORQUE SHAFT
Filed July 1, 1944  2 Sheets-Sheet 1
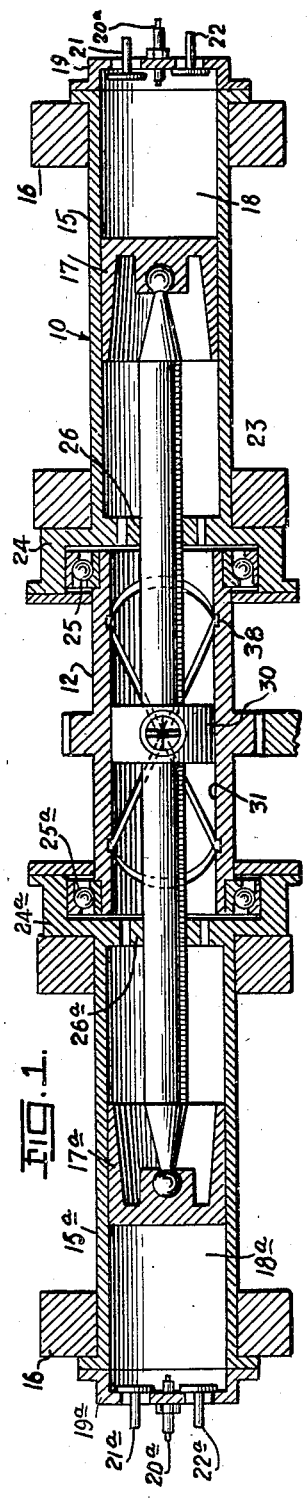
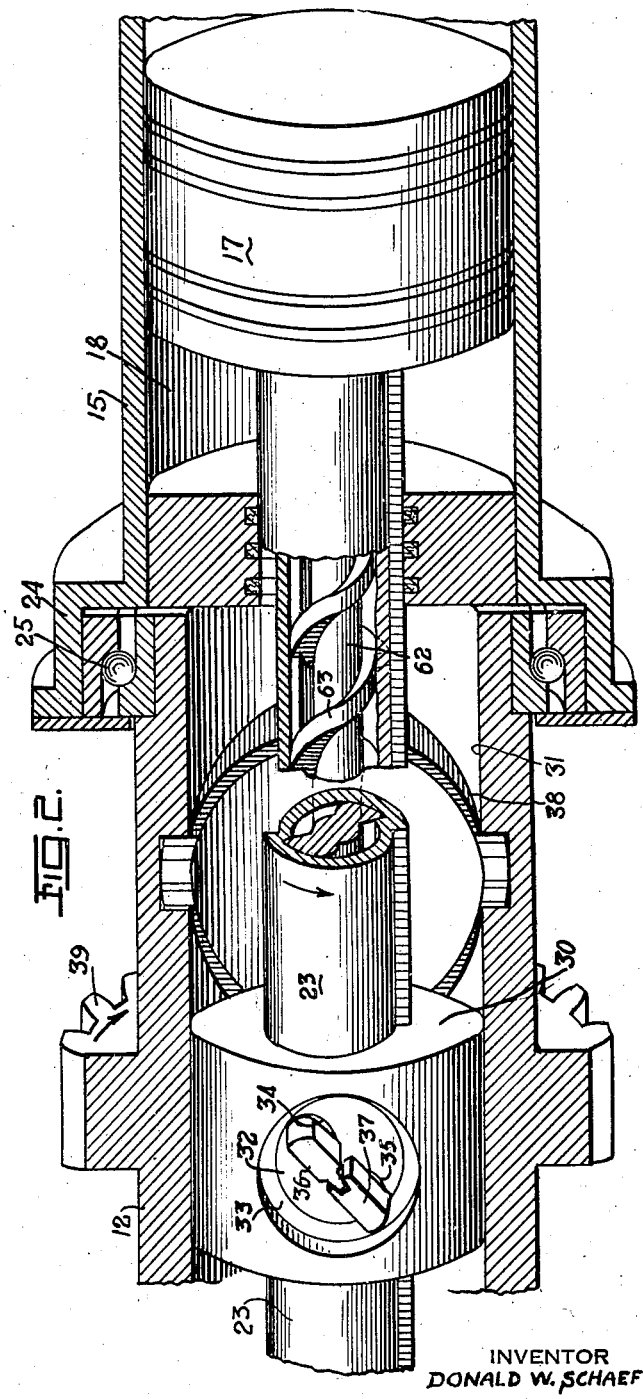
INVENTOR
DONALD W. SCHAEFFER,
BY
Toulmin + Toulmin
ATTORNEYS Feb. 5, 1946. D. W. SCHAEFFER 2,394,490
TORQUE SHAFT
Filed July 1, 1944 2 Sheets-Sheet 2
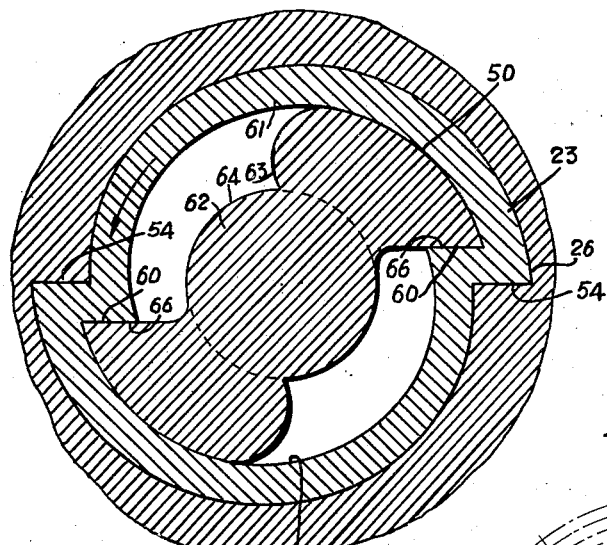
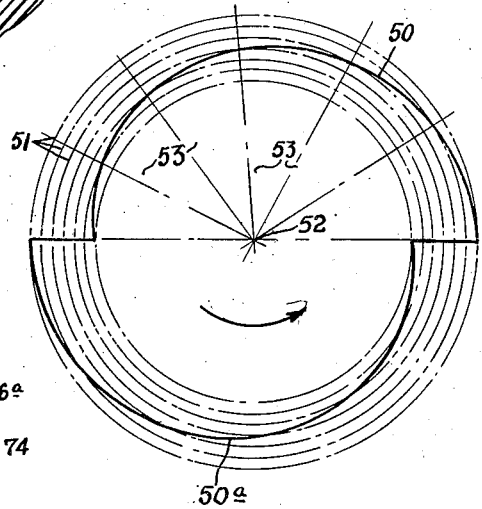
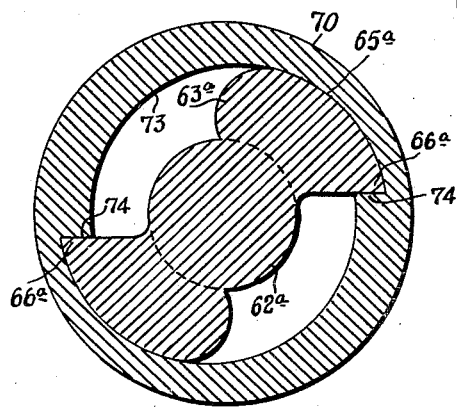
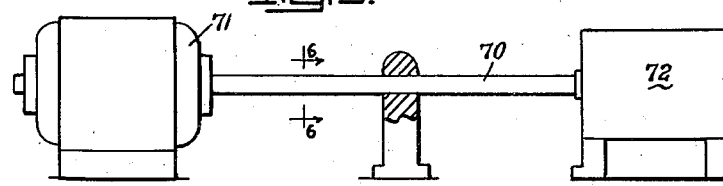
INVENTOR
DONALD W. SCHAEFFER,
BY
Toulmin + Toulmin
ATTORNEYS Patented Feb. 5, 1946

2,394,490

UNITED STATES PATENT OFFICE 2,394,490

TORQUE SHAFT

Donald W. Schaeffer, Dayton, Ohio

Application July 1, 1944, Serial No. 543,092

10 Claims. (Cl. 74—57)

This invention relates to an internal combustion engine, and particularly to an engine wherein the reciprocating motion of the connecting rod of the pistons of the engine are translated into a rotary motion for transmitting power to a driven device.

In reciprocating internal combustion engines of the type wherein opposed pistons move in axial alignment, and are interconnected by means of a single connecting rod extending between the opposed pistons, wherein the movement of the connecting rod is used to translate the reciprocating motion of the pistons into a rotary motion, it is necessary to prevent the connecting rod from rotation preferably by the bearing means that support the connecting rod. Under such circumstances the bearing means absorb a continuous torque effort as applied to the connecting rod by the translation of the reciprocating motion into a rotary motion which produces considerable wear on the bearing. The usual odd shapes that are given to a connecting rod to prevent rotation thereof in the bearing has not provided for a balanced bearing load upon the entire bearing surface, and therefore uneven load distribution is carried by the bearing surface on the connecting rod and on the bearing surface of the stationary bearing so that uneven wear has occurred on the reciprocating member and on the bearing surface.

It is therefore an object of this invention to provide a bearing surface for a reciprocating member that moves in a stationary bearing to which a rotary torque is applied that will evenly distribute the torque load over the entire bearing surface.

Another object of the invention is to provide a bearing surface upon a reciprocating part that moves in a stationary bearing member that is in the form of a spiral of Archimedes whereby the torque load applied upon the reciprocating part is evenly distributed over the entire bearing surface.

It is still a further object of the invention to provide means for distributing the torque load upon a torque shaft throughout the entire length of the shaft by means of a member that is placed within the shaft for conducting the load of the torque applied upon the shaft throughout a length of the member, and for picking up the load from the shaft at various points throughout the length thereof.

Still another object of the invention is to provide a torque shaft that is hollow having a member that is placed within the hollow shaft in such a manner that the torque load upon the shaft is transmitted to the member positioned within the shaft and distributed throughout the length of the shaft and the member therein to thereby increase the strength of the shaft and prevent localized torque load in the shaft.

Still another object of the invention is to provide a torque shaft in accordance with the last two mentioned objects wherein the member that is positioned in the hollow torque shaft is in the form of a helix that is in positive engagement with the torque shaft at various intervals along the length of the shaft so that the torque load applied upon the helix has a tendency to uncoil the same and thereby transmit the torque load throughout the length of the helix and thereby distribute the torque load throughout the entire length of the shaft to eliminate localized strain upon the shaft.

Further objects and advantages will become apparent from the drawings and the following description.

In the drawings:

Figure 1 is a transverse cross sectional view through an internal combustion engine constructed and arranged to incorporate the features of invention as applied to the connecting rods or torque rods of the engine.

Figure 2 is an enlarged perspective cross sectional view, showing various elements of the internal combustion engine shown in Figure 1 in cross sections, to more clearly illustrate the arrangement of the parts in the torque shaft, or connecting rod.

Figure 3 is a transverse cross sectional view of the torque shaft, or connecting rod, showing the specific arrangement of the elements relative to one another.

Figure 4 is a diagrammatic layout view representing the manner in which the development of the bearing surface is obtained for the connecting rod, or torque shaft.

Figure 5 is a diagrammatic view representing the torque shaft between an electric motor and driven mechanism.

Figure 6 is a transverse cross sectional view taken along line 6—6 of Figure 5 illustrating the application of the torque distributing member within an ordinary torque shaft.

This invention relates to an internal combustion engine which may be either of the four-cycle or two-cycle type. The invention is also adaptable for application upon a gas engine or upon a Diesel engine, or upon any device that has a torque transmitted through a reciprocating member that must be held from rotation, and which should be of substantial strength. The principals of the invention therefore are not limited to the particular type of apparatus disclosed in the drawings, but are applicable to any torque shaft.

In Figure 1 there is disclosed one power unit of a gasoline engine of the four-cycle type that is adapted to be associated with a plurality of other power units disposed radially about a central drive shaft. Each of the power units is provided with a rotatable member that has a gear integral therewith that is adapted to be in operative association with a gear secured to the central drive shaft whereby rotation of the rotatable member on the plurality of power units causes rotation of the drive shaft for driving any device desired.

Each of the power units 10 consists of a pair of cylinders 15 and 15a that are disposed in axial alignment and are carried in a suitable frame structure 16. Each of the cylinders 15 receives a piston 17 and 17a respectively whereby the power chambers 18 and 18a are provided in the cylinders 15 and 15a. The cylinders 15 and 15a are provided with the usual heads 19 and 19a respectively for closing the end of the cylinder and for receiving the spark plugs 20 and 20a. The heads 19 and 19a are provided with inlet valves 21 and 21a and with outlet valves 22 and 22a respectively.

The pistons 17 and 17a are connected by means of a connecting rod 23 that rigidly connects the piston in spaced relationship with respect to one another and causes them to reciprocate in unison, this connecting rod 23 being more fully described hereinafter.

The rotatable member 12 is disposed around the connecting rod 23 and is positioned between the inner ends 24 and 24a of the cylinders 15 and 15a respectively. The member 12 is suitably bearinged in the ends 24 and 24a by means of the ball bearing members 25 and 25a.

In order to change the reciprocating motion of the connecting rod 23 into a rotary motion for driving a drive shaft, a piston 30 is slidably disposed within a cylinder bore 31 provided in the rotatable member 12. The piston 30 is suitably secured to the connecting rod 23 and is adapted to reciprocate axially within the cylinder bore 31. The piston 30 is prevented from rotation in the cylinder 31 by the connecting rod 23 that has a special external shape provided thereon to prevent its rotation in the bearings 26 and 26a, but which can reciprocate in the bearings 26 and 26a.

The piston member 30 carries a cylindrical member 32 that is positioned within a bearing sleeve 33 provided at a right angle to the axis of the piston 30. The cylindrical member 32 is adapted to rotate within the bearing sleeve 33 as caused by a pair of cylindrical members 34 and 35 that have their axes parallel to the axis of the member 32.

The cylindrical members 34 and 35 are provided with extensions 36 and 37 respectively that are adapted to engage a track 38 provided in the cylinder wall 31. The track 38 has a configuration in the nature of a figure 8 and is continuous from one end of the cylinder 31 to the opposite end thereof so that by reciprocation of the piston 30 in the cylinder 31 the extensions 36 and 37 on the piston 30 will follow the track 38 and thereby cause rotation of the rotatable member 12. The particular construction and arrangement of the piston 30, the member 12, and the track 38 are all more particularly set forth in my copending application Serial No. 461,281 filed October 8, 1942, and does not constitute a part of the invention of this application.

It will therefore become apparent that when the pistons 30 reciprocate axially within the rotatable member 12 that a torque is applied upon the connecting rod 23 attempting to force the same to rotate in the bearings 26 and 26a, and therefore applies a force upon the bearing surfaces that produces friction when the connecting rod 23 reciprocates in the bearings 26 and 26a. With the rotatable member moving in the direction of the arrow 39 shown in Figure 2, the torque thrust applied upon the connecting rod 23 will be in the direction of the arrow placed upon the connecting rod in Figure 2. The surface contour of the connecting rod 23 thus will determine the manner of load distribution to the surface of the torque applied to the connecting rod tending to rotate the same while moving axially through the bearing 26.

As illustrated in Figures 3 and 4, the exterior surface of the connecting rod 23 is provided with a special contour that will provide for load distribution equally over the entire surface of the connecting rod bearing surface. The torque applied upon the connecting rod 23 by movement of the piston 30 in the cylinder 31 is in the direction of the arrow shown on Figure 3.

The development of the contour of the surface 50 on the connecting rod 23 is shown more specifically in Figure 4. In preparing the development on the surface 50 of the connecting rod 23, a plurality of equal distantly spaced circles 51 are constructed about an axis 52, which represents the axis of the connecting rod 23. The circumference of the circles 50 are then divided into equal arcs by the radii 53. The intersecting points between the circles 51 and the radii 53 are then joined so as to produce a smoothly flowing curved surface extending from the outermost circle to the innermost circle, which curve includes one-half the circumference of the circles 51 and thus represents one-half the circumference of the connecting rod 23. The surface 50 of the connecting rod 23 is thus shaped in the form of a spiral wherein the surface moves outwardly from the axis or point of generation, equal distances for each predetermined degree of rotation of the generating point about the axis, so that the spiral is in effect a "Spiral of Archimedes." The surface 50a on the opposite side of the connecting rod is generated in the same manner.

When the surfaces 50 and 50a are generated in the manner heretofore described, any tendency toward rotation of the connecting rod 23 about the axis 52 thereof, will cause any point on the surface of the connecting rod to move radially outwardly a distance equal to the movement of each and every other point on the same surface. Therefore, any tendency toward rotation of the connecting rod 23 is carried by the entire bearing surface area of the connecting rod. It will of course be understood that the bearing 26 has the surface thereof formed to a contour which matches that of the connecting rod 23 so that the connecting rod can reciprocate in the bearing 26 but cannot rotate therein. Since all torque applied upon the connecting rod 23 is in the direction of the arrow shown in Figure 4, it will be apparent that the lips 54 on opposite sides of the connecting rod 23 do not carry any torque load, and in fact if there is any rotative effect between the connecting rod 23 and the bearing surface for the same, the lips 54 on the connecting rod 23 will separate from the corresponding lips in the bore 26. With the torque load applied to the connecting rod 23 evenly distributed over the entire bearing surface thereof while reciprocating from the bore 26, the life of the bearing surface is greatly increased.

The torque load applied upon the connecting rod 23 in the engine illustrated in Figures 1 and 2 is relatively high, and it is desirable that the connecting rod, or torque shaft, should have its strength increased to as great an extent as possible without causing the use of extremely large diameters in the connecting rod to obtain the desired strength to resist the torque effort applied upon it. Under normal circumstances, the torque effort is applied upon a torque shaft at one end thereof, the torque being transmitted to a driven device at the opposite end so that the torque load is more or less centralized at the point of application of the load upon the torque shaft and the point of transmission thereof to the driven device, which torque tends toward a twisting of the entire torque shaft.

In this invention, however, the connecting rod 23, or torque shaft, is constructed in the form of a hollow tube wherein there is placed a member in the form of a helix to absorb the torque applied to the torque shaft and evenly distribute the torque load over the entire length of the torque shaft rather than permitting the aforementioned conditions of localized torque effort to exist.

As aforementioned, the connecting rod 23 is a hollow substantially tubular member that is provided with the exterior surface shaped as heretofore described. When the tube is thus formed, there is provided the ledges 60 on opposite sides thereof that are formed when the tube is shaped to the aforementioned configuration. Also, interior surface 61 of the hollow tube forming the connecting rod 23 is of substantially the same configuration as the surfaces 50 and 50a of the connecting rod tube 23.

The rigid member 62 is placed within the connecting rod tube 23 with the axis thereof coinciding with the axis of the connecting rod tube 23. The member 62 has a fin 63 positioned radially therefrom and extending from one end of the tube to the other, this fin being in the form of a helix surrounding the cylindrical body 64 of the member 62.

The helix 63 is provided with an exterior surface 65 that conforms at least in part to the inner surface 61 of the connecting rod tube 23 so that the surface 65 of the helix will be in surface engagement with the inner surface 61 of the tubular connecting rod 23 from end to end thereof. Also, the helix 63 is provided with recess portions 66 that engage the ledges 60 provided in the inner surface 61 of the tubular connecting rod 23. The helix 63 thus engages the ledges 60 each 180° of rotation about the axis of the connecting rod. In addition, the helix is shaped so that a torque applied on one end thereof has the tendency to unwind the helix in the manner of a coil spring.

When the member 62 is placed in the hollow connecting rod tube 23, it is placed therein as a press fit so that the surface 65 of the helix is in full surface engagement with the surface 61 of the connecting rod tube 23, and the recess portions 66 on the helix are in positive engagement with the ledges 60. Thus, when a torque effort is applied to the connecting rod 23 in the direction of the arrow shown on Figure 4, the torque is transmitted directly to the member 62 from the helix 63, and since the helix 63 engages ledges at periodic intervals along the length of the connecting rod 2, it will be apparent that the torque effort applied to the connecting rod tube will be transferred to the helix 63 and the member 62 at periodic intervals along the helix 63, thus absorbing the torque effort along the entire connecting rod tube 23. The torque effort applied to the connecting rod tube 23 has the tendency to uncoil the helix 63, which being in a press fit engagement with the surfaces 61 of the tube 23, supports the tube throughout the entire length thereof and thus increases the strength of the connecting rod tube 23. Since the helix 63 engages the connecting rod tube 23 intermittently throughout its length, it is not necessary for the torque effort of the tube to be transmitted completely from end to end thereof unsupported, but rather the torque effort upon the tube 23 will be picked up periodically by the helix and transmitted to the member 62 thereby eliminating long lengths of unsupported torque tube.

In Figures 6 and 7 there is illustrated the use of the strengthening helix in a common torque shaft, which in this instance is a torque tube. The torque tube 70 is connected at one end to a power source such as an electric motor 71, and is connected to a driven mechanism 72 at the opposite end thereof. The torque tube 70 has an internal bore 73 that has the surfaces thereof arranged excentrically to provide the ledges 74 on opposite sides of the bore 73. A member 62a similar to that heretofore described is inserted in the bore 73, as a press fit therein, so that the surface 65a of the helix 63a engages the bore 73, and the lips 66a on the helix 63a engage the ledges 74. The functioning of the member 62a within the torque shaft, or tube 70, is the same as heretofore described with regard to the functioning of the member 62 in the connecting rod tube 23.

While the apparatus disclosed and described herein constitutes a preferred form of the invention, yet it will be understood that the apparatus is capable of alteration without departing from the spirit of the invention, and that modifications that fall within the scope of the appended claims are intended to be included herein.

Having thus fully described my invention, what I claim as new and desire to secure by Letters Patent is:

1. In combination, a power shaft supported in a bearing member, a load bearing surface on said power shaft parallel to the axis of said shaft and disposed in the form of a spiral about the axis of the power shaft with the axis of the spiral coinciding with the axis of the shaft, and a surface in said bearing complementary to said surface on said shafts of the power shaft for cooperating with the surface on the power shaft to thereby support the same.

2. In combination, a power shaft, bearing means for supporting said power shaft for reciprocation therein, said power shaft having at least a part of the exterior surface thereof disposed parallel to the axis of said shaft in an arrangement of a spiral about the axis of the power shaft with the axis of the spiral coinciding with the axis of the shaft, and a surface in said bearing complementary to said surface on said shaft to cooperate with the said spiral surface on said shaft to support said shaft in said bearing.

3. In combination, a power shaft, bearing means for supporting said power shaft for reciprocation therein, said power shaft having at least a part of the exterior surface thereof disposed parallel to the axis of said shaft in an arrangement of a spiral about the axis of the power shaft with the axis of the spiral coinciding with the axis of the shaft, and a surface in said bearing complementary to said surface on said shaft to cooperate with the said spiral surface on said shaft to support said shaft in said bearing, to prevent rotation of said shaft in said bearing but with complete freedom of axial movement therein.

4. In combination, a power shaft having at least a part of the exterior surface thereof disposed parallel to the axis of the shaft and arranged in the form of a spiral about the longitudinal axis of the shaft with the axis of the spiral coinciding with the axis of the shaft, said spiral surface having a contour generated by a point moving radially outwardly from the axis of the power shaft a predetermined distance for each degree of rotation thereof about the axis of the power shaft, and a bearing having a spiral surface therein generated in the same manner as the spiral surface on said shaft for cooperating therewith to support said power shaft.

5. In combination, a power shaft having exterior load bearing surfaces extending longitudinally thereof parallel to the axis of the shaft, each of said surfaces being arranged in the form of a spiral about the longitudinal axis of the shaft with the axis of the spiral coinciding with the axis of the shaft, said spiral surfaces each having a contour generated by a point moving radially outwardly from the axis of the power shaft a predetermined distance for each degree of rotation thereof about the axis of the power shaft and extending 180° about said shaft, a bearing member for said shaft, and a spiral surface in said bearing generated in the same manner as the spiral surface on said shaft for cooperating therewith to support said power shaft thereon, to prevent rotation of said power shaft in said bearing and evenly distribute a torque load applied to the shaft over the entire contacting spiral surfaces between said shaft and said bearing.

6. In combination, a hollow torque shaft having an inner surface parallel to the axis of the shaft and arranged in the form of a spiral with the axis of the spiral coinciding with the axis of the shaft whereby to form a ledge extending longitudinally of said shaft in said inner surface, and a rigid member positioned within said hollow torque shaft having a helix thereon engaging the ledge on the inner surface of said torque shaft periodically along the length thereof, whereby to transfer torque effort upon said torque shaft to said member.

7. In combination, a hollow power shaft adapted for movement relative to a supporting bearing surface and adapted to have torque applied thereto tending to rotate the power shaft relative to the bearing surface, a bearing member having a bearing surface for supporting the power shaft, said power shaft having at least the surface thereof for supporting the shaft upon the bearing arranged in the form of a spiral about the axis of the power shaft with the spiral moving outwardly relative to the axis of the power shaft a predetermined distance for each degree of rotation thereof about the axis of the shaft, and a surface on said bearing having a similarly shaped spiral arrangement to cooperate with the supporting surface on the shaft and thereby distribute the torque load upon the shaft over the contacting surfaces of the shaft and the bearing, said spiral surfaces extending approximately 180° of rotation of said shaft whereby to form a ledge extending longitudinally of said shaft in said inner and outer surfaces, and a rigid member positioned within said hollow torque shaft having a helix thereon engaging the ledges on the inner surface of said torque shaft periodically along the length thereof, whereby to transfer torque effort upon said torque shaft to said member, the helix on said member having a direction of rotation thereon opposite to the direction of torque applied to said torque shaft whereby to tend to unwind said helix by the torque effort applied upon said shaft and thereby transferring the torque effort from the shaft to the said member.

8. In combination, a torque shaft having a hollow interior extending longitudinally thereof whereby to form an interior surface in the torque shaft, said interior surface of said torque shaft comprising a plurality of arcuately shaped surface areas disposed off center with regard to one another and parallel to the axis of the shaft to form ledges extending longitudinally of the shaft, and a rigid member positioned within said shaft having a helix thereon engaging said ledges periodically along the length of said shaft whereby to transmit the torque effort applied to the shaft to the said member.

9. In combination, a hollow power shaft adapted for movement relative to a supporting bearing surface and adapted to have torque applied thereto tending to rotate the power shaft relative to the bearing surface, a bearing member having a bearing surface for supporting the power shaft, said power shaft having at least the surface thereof for supporting the shaft upon the bearing arranged in the form of a spiral about the axis of the power shaft with the spiral moving outwardly relative to the axis of the power shaft a predetermined distance for each degree of rotation thereof about the axis of the shaft, and a surface on said bearing having a similarly shaped spiral arrangement to cooperate with the supporting surface on the shaft and thereby distribute the torque load upon the shaft over the contacting surfaces of the shaft and the bearing, said spiral surfaces extending approximately 180° of rotation of said shaft whereby to form a ledge extending longitudinally of said shaft in said inner and outer surfaces, and a rigid member positioned within said hollow torque shaft having a helix thereon engaging the ledges on the inner surface of said torque shaft periodically along the length thereof, whereby to transfer torque effort upon said torque shaft to said member.

10. In combination, a hollow torque shaft having an inner surface parallel to the axis of the shaft spirally generated from the axis of the shaft whereby to form a ledge in the inner surface extending longitudinally along the shaft, and a rigid member positioned within said hollow torque shaft having a helix thereon engaging the ledge on the inner surface of the torque shaft periodically along the length thereof and wound in a direction to expand when the torque is applied thereto by said torque shaft whereby torque is transferred from the torque shaft to said member.

DONALD W. SCHAEFFER.